United States Patent
Lee et al.

(10) Patent No.: US 9,429,774 B2
(45) Date of Patent: Aug. 30, 2016

(54) OPTIC MODULATOR AND METHOD OF MANUFACTURING THE SAME

(71) Applicants: SK hynix Inc., Gyeonggi-do (KR); Seoul National University R&DB Foundation, Seoul (KR)

(72) Inventors: Jong-Ho Lee, Seoul (KR); Keon Yoo, Gyeonggi-do (KR)

(73) Assignees: SK Hynix Inc., Gyeonggi-do (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 14/726,143

(22) Filed: May 29, 2015

(65) Prior Publication Data

US 2015/0346520 A1    Dec. 3, 2015

Related U.S. Application Data

(60) Provisional application No. 62/004,429, filed on May 29, 2014.

(51) Int. Cl.

| | | |
|---|---|---|
| G02B 6/12 | (2006.01) | |
| G01F 1/00 | (2006.01) | |
| G02F 1/01 | (2006.01) | |
| G02F 1/025 | (2006.01) | |

(52) U.S. Cl.
CPC .............. G02F 1/011 (2013.01); G02B 6/12 (2013.01); G02F 1/025 (2013.01); *G02B 2006/12123* (2013.01); *G02B 2006/12142* (2013.01)

(58) Field of Classification Search
CPC ....... G02F 1/011–1/0115; G02B 2006/12123; G02B 2006/12142
See application file for complete search history.

(56) References Cited

U.S. PATENT DOCUMENTS

| | | | | |
|---|---|---|---|---|
| 6,999,670 B1 * | 2/2006 | Gunn, III | ............... | G02F 1/025 385/131 |
| 2003/0063885 A1 * | 4/2003 | Gunn, III | ............... | B82Y 20/00 385/131 |
| 2005/0104684 A1 * | 5/2005 | Wojcik | ............... | B82Y 20/00 333/108 |
| 2011/0243492 A1 * | 10/2011 | Na | ............... | G02F 1/025 385/3 |
| 2014/0055838 A1 * | 2/2014 | Lee | ............... | H01L 31/105 359/279 |

FOREIGN PATENT DOCUMENTS

| | | |
|---|---|---|
| KR | 1020080029614 | 4/2008 |
| KR | 1020140026846 | 3/2014 |

\* cited by examiner

*Primary Examiner* — Jerry Rahll
(74) *Attorney, Agent, or Firm* — IP & T Group LLP

(57) ABSTRACT

An optic modulator may include: an optical waveguide including a ridge-shaped portion having a first region and a second region over the first region; a slab-shaped portion being in contact with a first region of the ridge-shaped portion; an optical waveguide electrode forming a Schottky contact with a second region of the ridge-shaped portion; metal plugs being in contact with the slab-shaped portion and the optical waveguide electrode, respectively; and metal pads connected to the respective metal plugs.

20 Claims, 6 Drawing Sheets

OPTIC MODULATOR AND METHOD OF MANUFACTURING THE SAME

BACKGROUND

1. Technical Field

Exemplary embodiments of the present invention relate to an optical device, and more particularly, to an optic modulator.

2. Related Art

Recently, with the increase in signal processing speed of integrated circuits, much research has been conducted on a method for implementing communications between semiconductor chips using optical signals. A core element of an optical integrated circuit for processing such optical signals is an electro-optic modulator. The electro-optic modulator generates an optical signal by modulating a constant intensity of light emitted from an external internal light source.

The optic modulator within the optical integrated circuit performs a function of converting an electrical signal into an optical signal. In order to perform such a function, the optic modulator uses an electro-optic effect. In particular, a semiconductor material such as silicon may have an effective refractive index which changes due to an internal carrier concentration changed by an external electric field. When such a plasma-dispersion effect is used to modulate a refractive index of a partial region of the optic modulator into an electrical signal, the optic modulator having a unique structure may generate an optical signal through an interference effect with light incident on the optic modulator. As a method for changing the internal carrier concentration of the optic modulator, a P-I-N diode structure is mainly used. The optic modulator having a P-I-N diode structure includes an intrinsic semiconductor region and an extrinsic semiconductor region. The intrinsic semiconductor region is set to a region through which light passes. Then, an external electrical signal is applied through the extrinsic semiconductor region being in contact with the intrinsic semiconductor region and doped with a dopant, and carriers are supplied to or discharged from the intrinsic semiconductor region, thereby modulating the effective refractive index of the corresponding region.

FIG. 1 is a cross-sectional view of an optic modulator having a P-I-N diode structure.

The optic modulator 100 having a P-I-N diode structure includes an intrinsic semiconductor region 132 through which light passes and N-type and P-type doping regions 131 and 133 for supplying/discharging carriers to/from the intrinsic semiconductor region 132. A passivation layer 140 is formed over the intrinsic semiconductor region 132, the N-type doping region 131, and the P-type doping region 133. Through the passivation layer 140, plugs 151 are connected to the N-type doping region 131 and the P-type doping region 133, respectively. Pads 161 are formed over the respective plugs 151.

The optic modulator having a P-I-N diode structure has the following problems.

The volume of the intrinsic semiconductor region 132 is relatively large, and the contact area between the intrinsic semiconductor region 132 and the N-type and P-type doping regions 131 and 132 is relatively small. Thus, it takes a long time to supply/discharge carriers.

Furthermore, the switching type of the P-I-N diode structure is limited. In particular, it takes a long time to discharge minority carriers supplied to the intrinsic semiconductor region 132, because the minority carriers have a long life time.

SUMMARY

Various embodiments are directed to an optic modulator capable of realizing a high-speed operation, and a method of manufacturing the same.

In an embodiment, an optic modulator may include: an optical waveguide including a ridge-shaped portion having a first region and a second region over the first region; a slab-shaped portion being in contact with a first region of the ridge-shaped portion; an optical waveguide electrode forming a Schottky contact with a second region of the ridge-shaped portion; metal plugs being in contact with the slab-shaped portion and the optical waveguide electrode, respectively; and metal pads connected to the respective metal plugs. The optical waveguide electrode may include a conductive material optical transparency. The optical waveguide electrode may include ITO (Indium Tin Oxide). The contact area between the ridge-shaped portion and the optical waveguide electrode may be larger than the contact area between the ridge-shaped portion and the slab-shaped portion. The optic modulator may further include: a semiconductor substrate; and an insulating layer over the semiconductor substrate, and the optical waveguide and the slab-shaped portion may be positioned over the insulating layer. The slab-shaped portion may include: a first slab-shaped portion being in contact with one side of the first region of the ridge-shaped portion; and a second slab-shaped portion being in contact with the other side of the first region of the ridge-shaped portion. The ridge-shaped portion may include an undoped intrinsic silicon layer, and the slab-shaped portion may include an extrinsic silicon layer doped with an hl-type dopant. The ridge-shaped portion and the slab-shaped portion may have different thicknesses while being in horizontal contact with each other. The cross-section of the optical waveguide may have a smaller size than the effective wavelength of light passing through the optical waveguide. The slab-shaped portion and the first region of the ridge-shaped portion may have the same thickness, and the slab-shaped portion may have a smaller thickness than the second region of the ridge-shaped portion. The semiconductor substrate, the optical waveguide, and the slab-shaped portion may include silicon, SiGe, or compound semiconductor. The optic modulator may have a one-side structure in which the slab-shaped portion is in contact with one side of the first region of the ridge-shaped portion.

In an embodiment, an optic modulator may include: a Schottky diode including a ridge-shaped portion containing intrinsic silicon, a slab-shaped portion being in contact with a first region of the ridge-shaped portion and containing extrinsic silicon, and ITO forming to a Schottky contact with a second region of the ridge-shaped portion; metal plugs being in contact with the slab-shaped portion and the optical waveguide electrode, respectively; and metal pads connected to the respective metal plugs. The contact area between the ridge-shaped portion and ITO may be larger than the contact area between the ridge-shaped portion and the slab-shaped portion. The slab-shaped portion may include: a first slab-shaped portion being in contact with one side of the first region of the ridge-shaped portion and containing first extrinsic silicon; and a second slab-shaped portion being in contact with the other side of the first region of the ridge-shaped portion and containing second extrinsic silicon. The second region of the ridge-shaped portion may have a larger thickness than the first region of the ridge-shaped portion, and the first region and the slab-shaped portion may have the same thickness.

In an embodiment, an optic modulator may include: an optical waveguide including a ridge-shaped portion having a first region and a second region over the first region; a slab-shaped portion being in contact with the first region of the ridge-shaped portion an electrode covering the top surface and both sidewalls of the second region of the ridge-shaped portion; an inter-insulating layer positioned between the electrode and the second region; metal plugs being in contact with the slab-shaped portion and an electrode, respectively; and metal pads connected to the respective metal plugs. The electrode may include ITO. The ridge-shaped portion may contain intrinsic silicon, and the slab-shaped portion may contain extrinsic silicon. A part of the electrode may be in contact with the first region of the ridge-shaped portion.

In accordance with the embodiments of the present invention, the optic modulator may employ the modulation method based on the Schottky diode structure using a Schottky contact between metal and semiconductor. Thus, since the optic modulator has a rapid response characteristic, the optic modulator may effectively modulate an electrical signal having a high frequency into an optical signal.

Furthermore, since ITO which can perform a high-speed operation and is optically transparent is employed as a conductive material, ITO may have a small influence on an optical confinement factor in the optical waveguide, thereby contributing to changing the effective refractive index of the optical modulator and minimizing a light loss factor in the optic modulation region.

As the optic modulator employs the modulation method based on the Schottky diode structure using a Schottky contact between metal and semiconductor, the performance of the optic modulator can be improved by the rapid response characteristic and low resistance of the Schottky diode and the improvement in optical confinement factor through the use of the transparent metal electrode.

DETAILED DESCRIPTION

Figure 1:
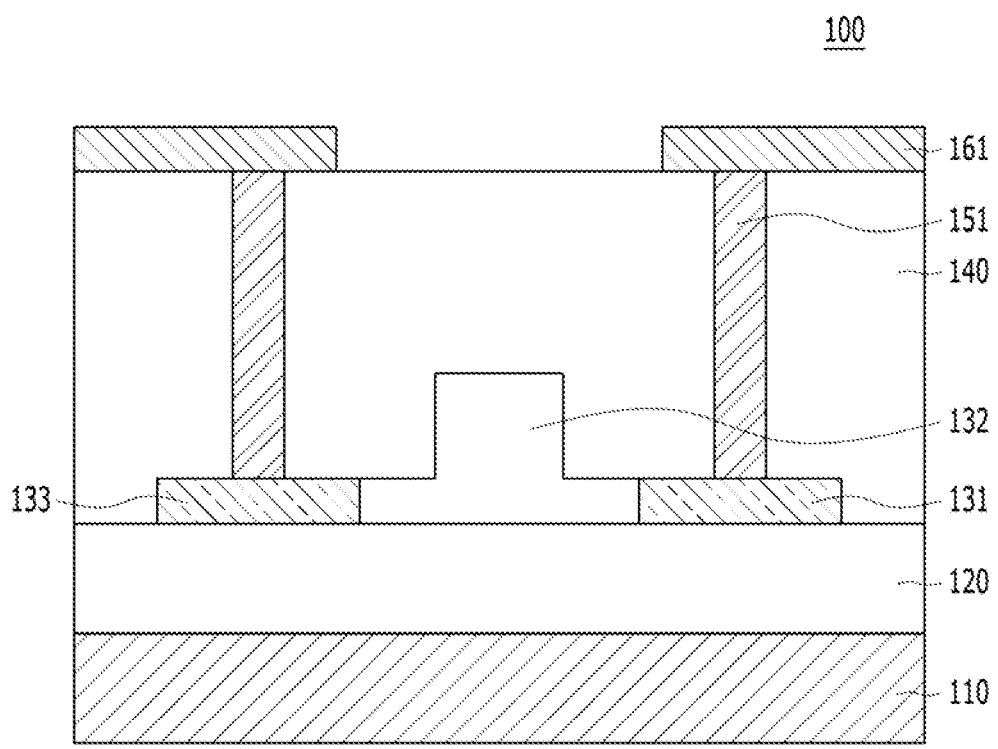
FIG. 1 is a cross-sectional view of an optic modulator having a P-I-N diode structure.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The drawings are not necessarily to scale and in some instances, proportions may have been exaggerated in order to clearly illustrate features of the embodiments. When a first layer is referred to as being "on" a second layer or "on" a substrate, it not only refers to a case where the first layer is formed directly on the second layer or the substrate but also a case where a third layer exists between the first layer and the second layer or the substrate.

The characteristics of an optic modulator may be evaluated according to the modulation efficiency and modulation speed of an optic modulation region. The modulation efficiency may indicate significantly changing the carrier concentration of the optic modulation region even at a low operating voltage and a small operating current. In general, the modulation efficiency may be expressed as an index such as power consumption per bit, resonant frequency variation per unit voltage, or resonant frequency variation per unit length of the modulation region. The modulation speed may be set by the change speed of carrier concentration in the optic modulation region, and determine the maximum operating frequency of the optic modulator.

Hereafter, optic modulators in accordance with embodiments may include an optic modulator with a Schottky diode structure, which uses ITO (Indium Tin Oxide) as an electrode. The optic modulator may include an insulating layer stacked at a sufficient thickness over a semiconductor substrate, a silicon layer formed at a small thickness over the insulating layer, and an optic modulation region formed in the silicon layer. The optic modulation region may include an optical waveguide region (thick silicon region) formed in the center thereof and a high-concentration doping region (thin silicon region) around the optical waveguide region. The optical waveguide region may include an intrinsic semiconductor region. The top of the optical waveguide region may be in direct contact with the ITO having a predetermined thickness. Thus, the intrinsic semiconductor region and the ITO may form a Schottky contact. Metal plugs may be formed over the high-concentration doping region and the ITO, respectively, and metal pads corresponding to the metal plugs may be formed. Through the respective metal pads, proper electrical signals may be applied. The above-described optic modulation region may be operated to supply/discharge carriers into/from the intrinsic semiconductor region through a flow of current applied through the metal pads. The optic modulation region may be formed over an SOI (Silicon-On-Insulator) substrate or silicon bulk substrate. In the case of the SOI substrate, an optic modulation region may be formed at an upper silicon layer. In the case of the silicon bulk substrate, an oxide layer may be formed over the silicon bulk substrate, and a single-crystal silicon layer may be formed over the oxide layer. The optic modulation region may be formed in the single-crystal silicon layer. The single-crystal silicon layer may be formed by depositing amorphous silicon or polysilicon on the oxide layer and then single-crystallizing the amorphous silicon or polysilicon through SPE (Solid Phase Epitaxial) or LEG (Laser Epitaxial Growth).

Figure 2A:
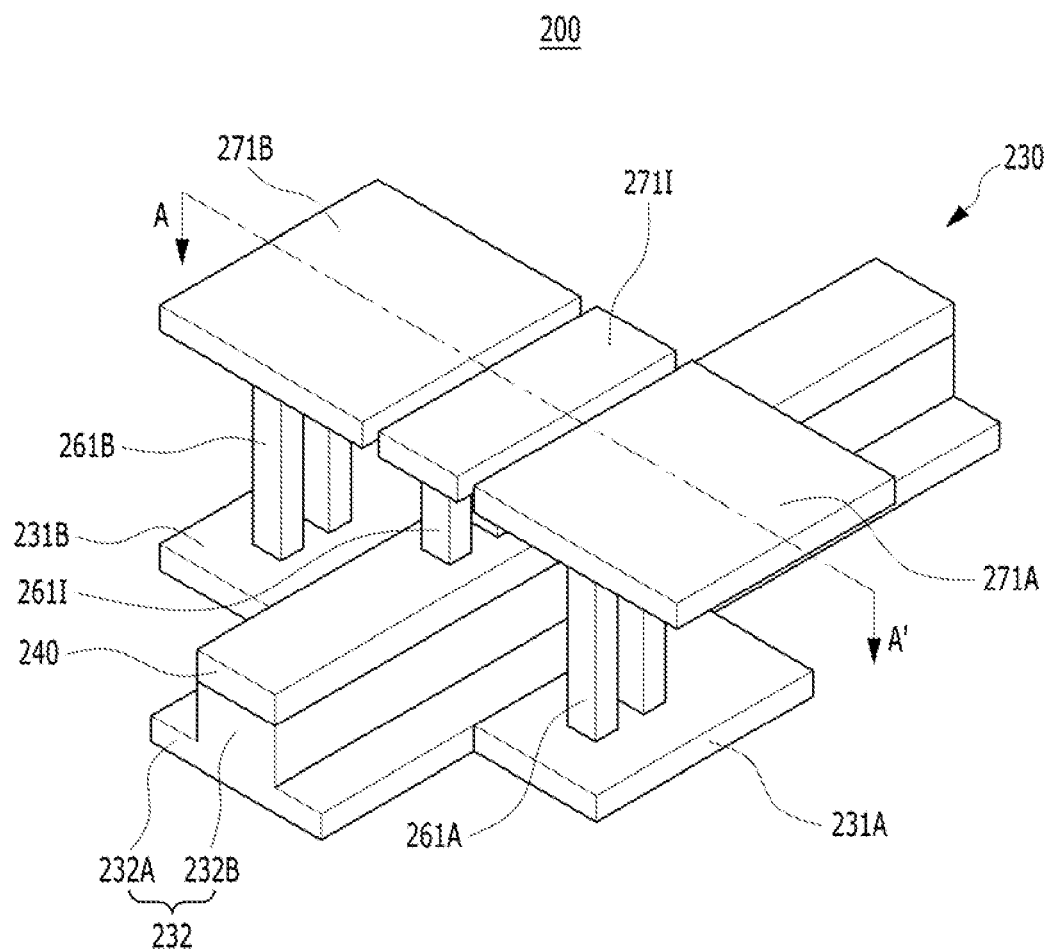
FIG. 2A is a perspective view of an optic modulator in accordance with a first embodiment.
Figure 2B:
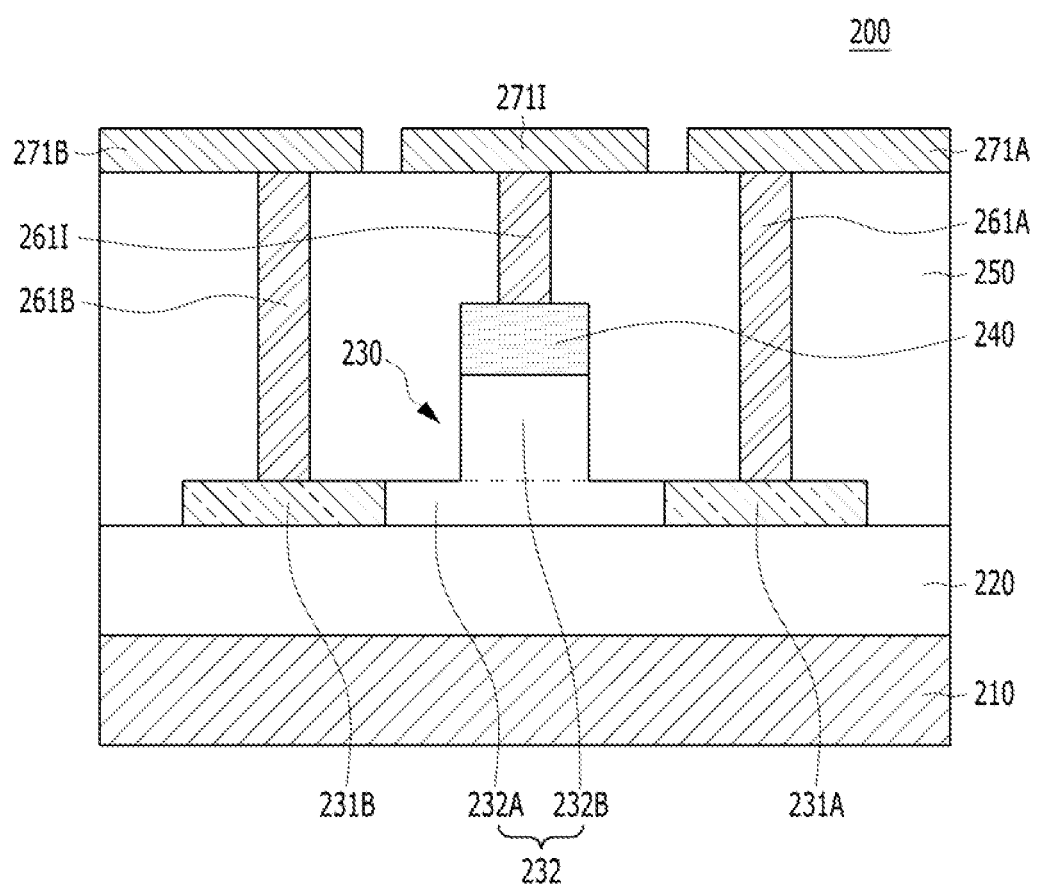
FIG. 2B is a cross-sectional view of the optic modulator, taken along like A-A' of FIG. 2A.

FIG. 2A is a perspective view of an optic modulator in accordance with a first embodiment. FIG. 2B is a cross-sectional view of the optic modulator, taken along like A-A' of FIG. 2A.

Referring to FIGS. 2A and 2B, the optic modulator 200 in accordance with the present embodiment may be formed over a semiconductor substrate 210. The semiconductor substrate 210 may include a material suitable for semiconductor processing. The semiconductor substrate 210 may contain silicon. For example, the semiconductor substrate 210 may include a silicon substrate. In another embodiment, the semiconductor substrate 210 may include a single-crystal silicon substrate. The semiconductor substrate 310 may include a SiGe substrate. The semiconductor substrate 210 may include a compound semiconductor such as GaAs or InP.

An insulating layer 220 may be formed over the semiconductor substrate 210. The insulating layer 220 may include silicon oxide. The insulating layer 220 may be formed through oxidation or deposition. The insulating layer 220 may serve to optically separate the semiconductor substrate 210 and an optical waveguide 230 from each other. Thus, the insulating layer 220 needs to secure a predetermined thickness. For example, the insulating layer 220 may be formed to a thickness of 1 μm or more.

The optical waveguide 230 may be formed over the insulating layer 220. The optical waveguide 230 may include a semiconductor layer such as silicon, Site, or compound semiconductor. The optical waveguide 230 may be formed by depositing a semiconductor layer or growing a semiconductor layer through crystal growth and then patterning the semiconductor layer through lithography and chemical etching. The optical waveguide 230 may include a ridge-shaped portion 232. An optical signal may pass through the ridge-shaped portion 232. The ridge-shaped portion 232 may include a ridge-shaped semiconductor material. The ridge-shaped portion 232 may include an intrinsic semiconductor layer. That is, the ridge-shaped portion 232 may include a semiconductor layer which is not doped with a dopant, that is, an undoped semiconductor layer. The ridge-shaped portion 232 may include an intrinsic silicon layer. The ridge-shaped portion 232 may have various configurations. For example, the ridge-shaped portion 232 may have various shapes, widths, and heights. The ridge-shaped portion 232 may have a width of 500 nm and a height of 200 nm. The ridge-shaped portion 232 may include first and second regions 232A and 232B. The first region 232A may be referred to as a lower portion, and the second region 232B may be referred to as an upper portion. The first region 232A may have a larger width than the second region 232B. The first region 232A may have a smaller height than the second region 232B. That is, the first region 232A may have a smaller thickness than the second region 232B. In order to prevent a loss of an optical signal, the second region 232B may have a smaller width than the first region 232A. In this case, the second region 232B may be positioned in the center of the first region 232A. Thus, the ridge-shaped portion 232 may have a symmetrical structure such as a T-shaped structure. The ridge-shaped portion 232 may have a smaller size than the effective wavelength of light transmitted to the ridge-shaped portion 232.

The sidewalls of the first region 232A of the ridge-shaped portion 232 may be in contact with a slab-shaped portion. The ridge-shaped portion 232 and the slab-shaped portion may have different thicknesses while being in horizontal contact with each other. For example, one side of the first region 232A of the ridge-shaped portion 232 may be in contact with a first slab-shaped portion 231A, and the other side of the first region 232A may be in contact with a second slab-shaped portion 231B. The other side may correspond to the opposite side of the one side. The ridge-shaped portion 232, the first slab-shaped portion 231A, and the second slab-shaped portion 231B may be simultaneously formed by partially etching the semiconductor layer. The first slab-shaped portion 231A and the second slab-shaped portion 231B may be formed of the same material as the ridge-shaped portion 232. For example, the ridge-shaped portion 232, the first slab-shaped portion 231A, and the second slab-shaped portion 231B may be formed of the same material such as silicon. Thus, no physical interface may exist between the ridge-shaped portion 232 and the first slab-shaped portion 231A. Furthermore, no physical interface may exist between the ridge-shaped portion 232 and the second slab-shaped portion 231B. The first slab-shaped portion 231A and the second slab-shaped portion 231B may have the same thickness. For example, the first slab-shaped portion 231A and the second slab-shaped portion 231B may have a thickness of 50 nm. The first region 232A of the ridge-shaped portion 232 may have the same thickness as the first slab-shaped portion 231A and the second slab-shaped portion 231B. The first slab-shaped portion 231A and the second slab-shaped portion 231B may contain a dopant therein. The dopant may include an N-type dopant or P-type dopant. In the present embodiment, the dopant may include an N-type dopant such as phosphorus. The dopant contained in the first slab-shaped portion 231A and the second slab-shaped portion 231B may have a high concentration. As such, the first and second slab-shaped portions 231A and 231B containing the dopant may be referred to as doping regions. When containing an N-type dopant, the first and second slab-shaped portions 231A and 231B may be referred to as high-concentration N-type doping regions. The dopant may have a concentration of approximately $10^{18}$ atoms/cm$^3$ or more. In another embodiment, the first slab-shaped portion 231A and the second slab-shaped portion 231B may be set to a low-concentration doping region and a high-concentration doping region, respectively. The low-concentration doping region may be formed proximate to the ridge-shaped portion 232, and the high-concentration doping region may be formed distal from the ridge-shaped portion 232. The low-concentration doping region may have a dopant concentration of approximately $10^{16}$ atoms/cm$^3$. In another embodiment, the first slab-shaped portion 231A and the second slab-shaped portion 231B may contain different dopants. In another embodiment, the first slab-shaped portion 231A and the second slab-shaped portion 231B may have different dopant concentrations.

Carriers may be introduced into the ridge-shaped portion 232 from the first slab-shaped portion 231A and the second slab-shaped portion 231B. Furthermore, carriers may be discharged from the ridge-shaped portion 232 into the first slab-shaped portion 231A and the second slab-shaped portion 231B. As the carriers are introduced or discharged, the effective refractive index of the ridge-shaped portion 232 may be changed. Thus, an operation of modulating an optical signal may be performed.

As described above, the ridge-shaped portion 232 may include an undoped intrinsic region, and the first and second slab-shaped portions 231A and 231B may include an extrinsic region doped with a high-concentration dopant. In the present embodiment, the ridge-shaped portion 232 may include an undoped intrinsic silicon layer, and the first and second slab-shaped portions 231A and 231B may include an extrinsic silicon layer doped with a high-concentration dopant.

As a result, the optic modulation region may include the optical waveguide 230 and the first and second slab-shaped portions 231A and 231B. The optic modulation region may be manufactured in a ridge shape in which the first and second slab-shaped portions 231A and 231B having a small thickness are proximate to the ridge-shaped portion 232 having a large thickness. The ridge-shaped optic modulation region may be obtained by adjusting an etching time of a selective chemical etching process. The first and second slab-shaped portions 231A and 231B may be doped with a high-concentration conductive dopant through a doping process such as an ion implantation process. The doping process may include plasma doping. Since the ridge-shaped portion 232 has a larger thickness than the first and second slab-shaped portions 231A and 231B, most of light may be concentrated on the ridge-shaped portion 232. The cross-section of the optical waveguide 230 may have a smaller size than the wavelength of light. Thus, when the size of the optic modulator 200 is decreased to reduce the resistance and capacitance of the optic modulator, the value of an electrical constant may be decreased so as to be suitable for a high-speed operation. When the cross-sectional size of the optical waveguide 230 has a specific value smaller than the wavelength of light, an optical mode of light passing through the optical waveguide 230 may be set to a specific value. In this case, since an optic operating point of the optic modulator 200 is limited, the operating characteristics of the optic modulator 200 may be improved.

On a part of the optical waveguide 230, that is, the top surface of the ridge-shaped portion 232, a conductive optical waveguide electrode 240 having optical transparency may be formed. The optical waveguide electrode 240 may include a metal containing material. The optical waveguide electrode 240 may be formed of conductive oxide. For example, the optical waveguide electrode 240 may include a transparent metal electrode formed of ITO. The optical waveguide electrode 240 may be in contact with the ridge-shaped portion 232 set to an intrinsic semiconductor region, and form a Schottky contact. Thus, the optical waveguide electrode 240, the ridge-shaped portion 232, and the first and second slab-shaped portions 231A and 231B may form a Schottky diode structure. The contact area between the optical waveguide electrode 240 and the ridge-shaped portion 232 may be larger than the contact area between the first slab-shaped portion 231A and the ridge-shaped portion 232. Furthermore, the contact area between the optical waveguide electrode 240 and the ridge-shaped portion 232 may be larger than the contact area between the second slab-shaped portion 231B and the ridge-shaped portion 232.

The optical waveguide 230, the first and second slab-shaped portion 231A and 231B, and the optical waveguide electrode 240 may be protected by the passivation layer 250. The passivation layer 250 may include an insulating material. The passivation layer 250 may include the same material as the insulating layer 220. For example, the passivation layer 250 may be formed of silicon oxide. In order to prevent a loss of an optical signal transmitted to the ridge-shaped portion 232, the passivation layer 250 relay be formed to a small thickness.

A first plug 261A may be formed so as to connect to the first slab-shaped portion 231A. A second plug 261B may be formed so as to connect to the second slab-shaped portion 231B. The first and second plugs 261A and 261B may be formed through the passivation layer 250. For example, the passivation layer 250 may be selectively etched to form openings which expose the surfaces of the first and second slab-shaped portions 231A and 231B, respectively, and the openings may be plugged up with a conductive material to simultaneously form the first and second plugs 261A and 261B, respectively. Reference numerals of the openings are omitted herein. The first and second plugs 261A and 261B may be formed of a metal containing material. Thus, the first and second plugs 261A and 261B may be referred to as metal plugs. The first and second plugs 261A and 261B may include aluminum, tungsten, copper, or a combination thereof. A third plug 261I may be formed at the same level as the first and second plugs 261A and 261B. That is, the first plug 261A, the second plug 261B, and the third plug 261I may be formed at the same time, and the third plug 261I may be connected to the optical waveguide electrode 240.

The first and second plugs 261A and 261B may be connected to first and second pads 271A and 271B, respectively, which can independently apply electrical signals. The first and second pads 271A and 271B may be formed of a metal containing material. The first and second pads 271A and 271B may include aluminum, copper, or tungsten. A third pad 271I may be formed at the same level as the first and second pads 271A and 271B. The third pad 271I may be connected to the third plug 251I. The first pad 271A, the second pad 271B, and the third pad 271I may be formed at the same time. The first pad 271A, the second pad 271B, and the third pad 271I may receive different electrical signals. A voltage applied to the first and third pads 271A and 271I may change effective resistance between the contact between the first slab-shaped portion 231A and the ridge-shaped portion 232 and the Schottky contact between the ridge-shaped portion 232 and the optical waveguide electrode 240. As a result, the internal carrier concentration of the ridge-shaped portion 232 may be changed. Similarly, a voltage applied to the second and third pads 271B and 271I may change effective resistance between the contact between the second slab-shaped portion 231B and the ridge-shaped portion 232 and the Schottky contact between the ridge-shaped portion 232 and the optical waveguide electrode 240. As a result, the internal carrier concentration of the ridge-shaped portion 232 may be changed.

The electrical signals applied through the first pad 271A, the second pad 272B, and the third pad 271I may supply carriers to the ridge-shaped portion 232 set to an intrinsic semiconductor region or discharge carriers of the ridge-shaped portion 232 through the Schottky diode structure. Thus, the effective refractive index of the ridge-shaped portion 232 may be changed to perform the function of the modulator.

The optic modulator 200 having a Schottky diode structure may have a two-dimensional current flow, and the contact area between the ridge-shaped portion 232 and the optical waveguide electrode 240 formed of a conductive material may be maximized. Thus, the optic modulator 200 may increase the mobility of the carriers. Simultaneously, since the optical confinement factor for the entire optical waveguide 230 is not significantly reduced, the modulation efficiency of the optic modulator 200 may be maintained.

Figure 3:
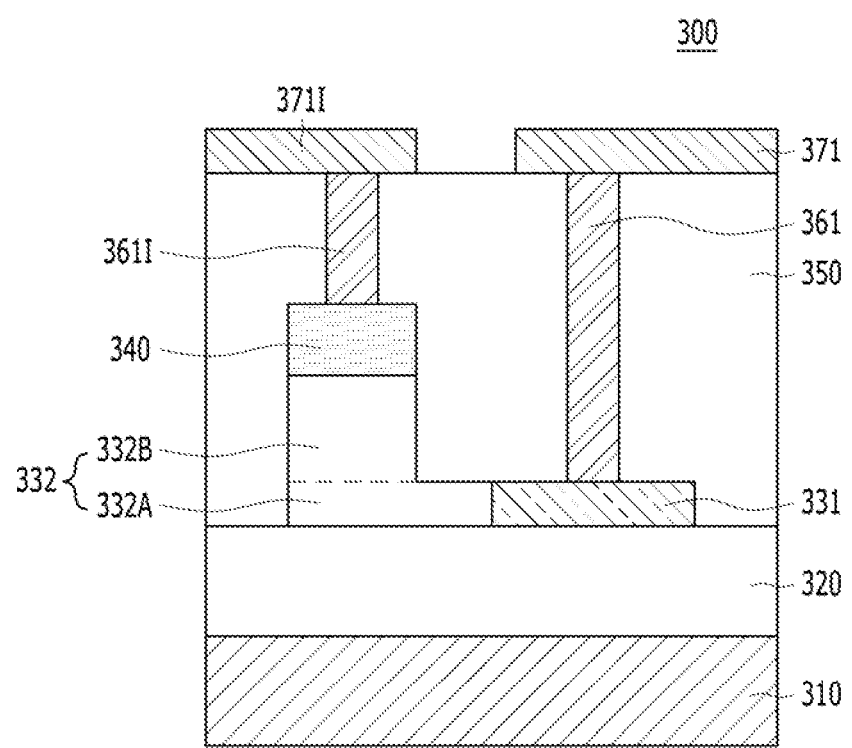
FIG. 3 is a diagram illustrating an optic modulator in accordance with a second embodiment.

FIG. 3 is a diagram illustrating an optic modulator in accordance with a second embodiment.

In the present embodiment, the optic modulator 300 may be formed over a semiconductor substrate 310. The semiconductor substrate 310 may include a material suitable for semiconductor processing. The semiconductor substrate 310 may contain silicon. For example, the semiconductor substrate 310 may include a silicon substrate. In another embodiment, the semiconductor substrate 310 may include a single-crystal silicon substrate. The substrate 310 may include a SiGe substrate. The semiconductor substrate 310 may include a compound semiconductor such as GaAs or InP.

An insulating layer 320 may be formed over the semiconductor substrate 310. The insulating layer 320 may include silicon oxide. The insulating layer 320 may be formed through oxidation or deposition. The insulating layer 320 may serve to optically separate the semiconductor substrate 310 and an optical waveguide 230 from each other. Thus, the insulating layer 320 needs to secure a predetermined thickness. For example, the insulating layer 320 may be formed to a thickness of 1 μm or more.

The optical waveguide 330 may be formed over the insulating layer 320. The optical waveguide 330 may include a semiconductor layer such as silicon, SiGe, or compound semiconductor. The optical waveguide 330 may be formed by depositing a semiconductor layer or growing a semiconductor layer through crystal growth and then patterning the semiconductor layer through lithography and chemical etching. The optical waveguide 330 may include a ridge-shaped portion 332. An optical signal may pass through the ridge-shaped portion 332. The ridge-shaped portion 332 may include a ridge-shaped semiconductor material. The ridge-shaped portion 332 may include an intrinsic semiconductor layer. That is, the ridge-shaped portion 332 may include an undoped semiconductor layer. The ridge-shaped portion 332 may include an intrinsic silicon layer. The ridge-shaped portion 332 may have various configurations. For example, the ridge-shaped portion 332 may have various shapes, widths, and heights. The ridge-shaped portion 332 may have a width of 500 nm and a height of 200 nm. The ridge-shaped portion 332 may include first and second regions 332A and 332B. The first region 332A may be referred to as a lower portion, and the second region 332b may be referred to as an upper portion. The first region 332A may have a larger width than the second region 332B. The first region 332A may have a smaller height than the second region 332B. That is, the first region 332A may have a smaller thickness than the second region 332B. In order to prevent a loss of an optical signal, the second region 332B may have a smaller width than the first region 332A. In this case, the second region 332B may be positioned at the top of one side of the first region 332A. Thus, the ridge-shaped portion 332 may have an asymmetrical structure such as an L-shaped structure. The ridge-shaped portion 332 may have a smaller size than the effective wavelength of light transmitted to the ridge-shaped portion 332.

A sidewall of the first region 332A of the ridge-shaped portion 332 may be in contact with a slab-shaped portion. For example, the one side of the first region 332A of the ridge-shaped portion 332 may be in contact with the slab-shaped portion 331. The other side of the first region 332A may not be in contact with the slab-shaped portion. As such, the optic modulation region in accordance with the second embodiment may have a one-side structure in which the single slab-shaped portion 331 is positioned only at one side of the first region 332A of the ridge-shaped portion. The ridge-shaped portion 332 and the slab-shaped portion 331 may have different thicknesses while being in horizontal contact with each other. The ridge-shaped portion 332 and the slab-shaped portion 331 may be simultaneously formed by partially etching the semiconductor layer. The slab-shaped portion 331 may be formed of the same material as the ridge-shaped portion 332. For example, the ridge-shaped portion 332 and the slab-shaped portion 331 may be formed of the same material such as silicon. Thus, no physical interface may exist between the ridge-shaped portion 332 and the slab-shaped portion 331. The slab-shaped portion 331 may have a small thickness. For example, the slab-shaped portion 331 may have a thickness of 50 nm. The first region 332A of the ridge-shaped portion 332 and the slab-shaped portion 331 may have the same thickness. The slab-shaped portion 331 may contain a dopant therein. The dopant may include an N-type dopant or P-type dopant. In the present embodiment, the dopant may include an N-type dopant such as phosphorus. The dopant within the slab-shaped portion 331 may have a high concentration. As such, the slab-shaped portion 331 containing a dopant may be referred to as a doping region. When containing an N-type dopant, the slab-shaped portion 331 may be referred to as a high-concentration N-type doping region. The dopant may have a concentration of approximately $10^{18}$ atoms/cm$^3$ or more. In another embodiment, the slab-shaped portion 331 may include a low-concentration doping region and a high-concentration doping region. The low-concentration doping region may be formed proximate to the ridge-shaped portion 332, and the high-concentration doping region may be formed distal from the ridge-shaped portion 332. The low-concentration doping region may have a dopant concentration of approximately $10^{16}$ atoms/cm$^3$.

Carriers may be introduced into the ridge-shaped portion 332 from the slab-shaped portion 331. Furthermore, carriers may be discharged from the ridge-shaped portion 332 into the slab-shaped portion 331. As the carriers are introduced or discharged, the effective refractive index of the ridge-shaped portion 332 may be changed. Thus, an operation of modulating an optical signal may be performed.

As described above, the ridge-shaped portion 332 may include an undoped intrinsic region, and the slab-shaped portion 331 may include an extrinsic region doped with a high-concentration dopant. In the present embodiment, the ridge-shaped portion 332 may include an undoped intrinsic semiconductor layer, and the slab-shaped portion 331 may include an extrinsic semiconductor layer doped with a high-concentration dopant.

As a result, the optic modulation region may include the optical waveguide 330 and the slab-shaped portion 331. The optic modulation region may be manufactured in a ridge shape in which the slab-shaped portion 331 having a small thickness is proximate to the ridge-shaped portion 332 having a large thickness. The ridge-shaped optic modulation region may be obtained by adjusting an etching time of a selective chemical etching process. The slab-shaped portion 331 may be doped with a high-concentration conductive dopant through a to doping process such as an ion implantation process. The doping process may include plasma doping. Since the ridge-shaped portion 332 has a larger thickness than the slab-shaped portion 331, most of light may be concentrated on the ridge-shaped portion 332. The cross-section of the optical waveguide 330 may have a smaller size than the wavelength of light. Thus, when the size of the optic modulator 300 is decreased to reduce the resistance and capacitance of the optic modulator 300, the optic modulator 300 may be suitable for high-speed operation.

On a part of the optical waveguide 330, that is, the top surface of the ridge-shaped portion 332, a conductive optical waveguide electrode 340 having optical transparency may be formed. The optical waveguide electrode 340 may include a metal containing material. The optical waveguide electrode 340 may be formed of conductive oxide. For example, the optical waveguide electrode 340 may include a transparent metal electrode formed of ITO. The optical waveguide electrode 340 may be in contact with the second region 332B of the ridge-shaped portion 332 set to an intrinsic semiconductor region, thereby forming a Schottky contact. Thus, the optical waveguide electrode 340, the ridge-shaped portion 332, and the slab-shaped portion 331 may form a Schottky diode structure. The contact area between the optical waveguide electrode 340 and the ridge-shaped portion 332 may be larger than the contact area between the slab-shaped portion 331 and the ridge-shaped portion 332.

The optical waveguide 330, the slab-shaped portion 331, and the optical waveguide electrode 340 may be protected by a passivation layer 350. The passivation layer 350 may include the same material as the insulating layer 320. For example, the passivation layer 350 may be formed of silicon oxide. In order to prevent a loss of an optical signal transmitted to the ridge-shaped portion 332, the passivation layer 350 may be formed to a small thickness.

A first plug 361 may be formed so as to connect to the slab-shaped portion 331. A second plug 361I may be formed so as to connect to the optical waveguide electrode 340. The first and second plugs 361 and 361I may be formed through the passivation layer 350. For example, the passivation layer 350 may be selectively etched to form openings which expose the surfaces of the slab-shaped portion 331 and the optical waveguide electrode 340, respectively, and the openings may be plugged up with a conductive material to simultaneously form the first and second plugs 361 and 361I, respectively. Reference numerals of the openings are omitted. The first and second plugs 361 and 361I may be formed of a metal containing material. Thus, the first and second plugs 361 and 361I may be referred to as metal plugs. The first and second plugs 361 and 361I may include aluminum, tungsten, copper, or a combination thereof. Thus, the first and second plugs 361 and 361I may be formed at the same level.

The first and second plugs 361 and 361I may be connected to first and second pads 371 and 371I, respectively, which can independently apply electrical signals. The first and second pads 371 and 371I may be formed of a metal containing material. The first and second pads 371 and 371I may include aluminum copper, or tungsten. The first and second pads 371 and 371I may be formed at the same level. The first and second pads 371 and 371I may receive different electrical signals.

The second embodiment may correspond to the case in which the slab-shaped portion 331 cannot be formed at both sides of the ridge-shaped portion 332, due to a spatial limitation. The operation principle of the second embodiment may be equal to that of the first embodiment.

The optic modulators 200 and 300 in accordance with the first and second embodiments may employ the Schottky diode structure, and thus have the following improvement effect.

Unlike the P-I-N diode structure, the Schottky diode structure using a Schottky contact between metal and semiconductor may have a rapid response characteristic. As a result, the Schottky diode structure may effectively modulate an electric signal having a high frequency into an optical signal.

Furthermore, due to the structural characteristic in which optically transparent ITO is in contact with the semiconductor layer across a wide region, the Schottky diode structure can supply or discharge carriers at high speed. Therefore, the Schottky diode structure may be suitable for high-speed operation.

Furthermore, the Schottky diode structure can perform a high-speed operation, and employ optically transparent ITO as a conductive material. Thus, the Schottky diode structure may have a small influence on the optical confinement factor for the optical waveguide, thereby contributing to changing the effective refractive index of the optic modulator and minimizing the light loss factor in the optic modulation region.

Figure 4:
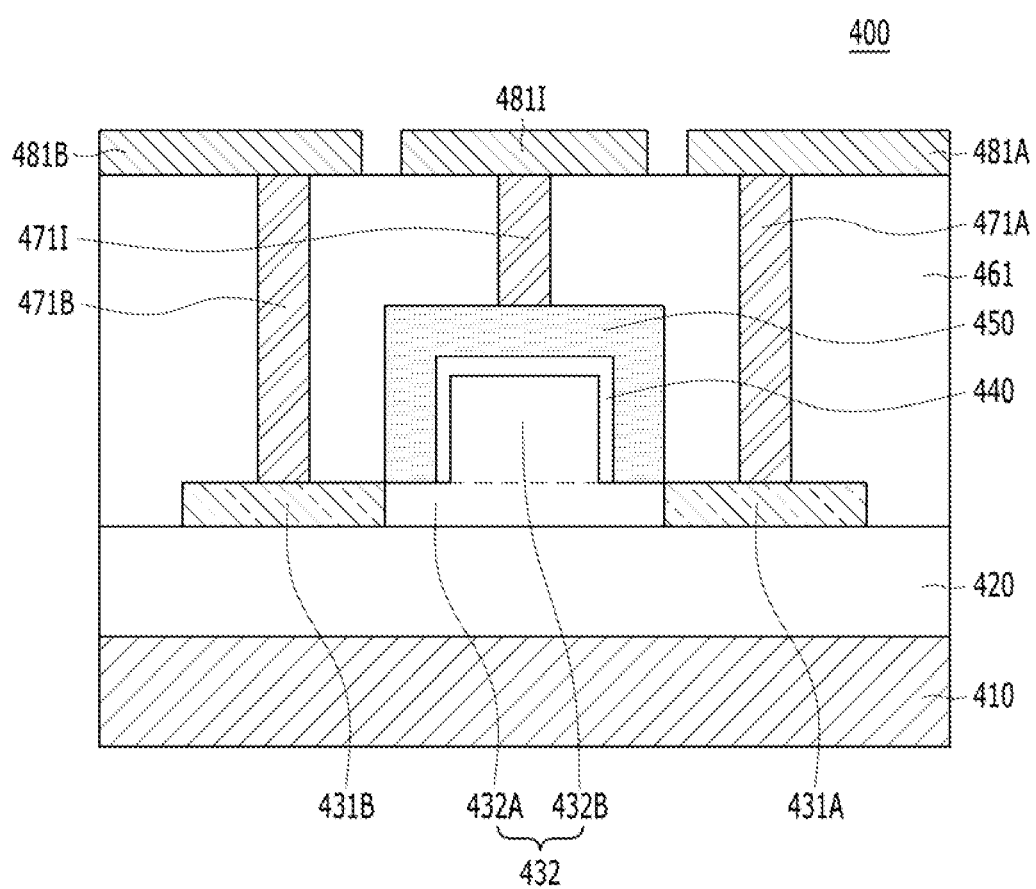
FIG. 4 is a diagram illustrating an optic modulator in accordance with a third embodiment.

FIG. 4 is a diagram illustrating an optic modulator in accordance with a third embodiment.

The third embodiment does not disclose an optic modulator having a Schottky diode structure, but discloses an optic modulator using a metal-insulator-semiconductor capacitor structure.

In the present embodiment, the optic modulator 400 may be formed over a semiconductor substrate 410. The semiconductor substrate 410 may include a material suitable for semiconductor processing. The semiconductor substrate 410 may contain silicon. For example, the semiconductor substrate 410 may include a silicon substrate. In another embodiment, the semiconductor substrate 410 may include a single-crystal silicon substrate. The substrate 410 may include a SiGe substrate. The semiconductor substrate 410 may include a compound semiconductor such as GaAs or InP.

An insulating layer 420 may be formed over the semiconductor substrate 410. The insulating layer 420 may include silicon oxide. The insulating layer 420 may be formed through oxidation or deposition. The insulating layer 420 may serve to optically separate the semiconductor substrate 410 and an optical waveguide 430 from each other. Thus, the insulating layer 420 needs to secure a predetermined thickness. For example, the insulating layer 420 may be formed to a thickness of 1 µm or more.

The optical waveguide 430 may be formed over the insulating layer 420. The optical waveguide 430 may include a semiconductor layer such as silicon, SiGe, or compound semiconductor. The optical waveguide 430 may be formed by depositing a semiconductor layer or growing a semiconductor layer through crystal growth and then patterning the semiconductor layer through lithography and chemical etching. The optical waveguide 430 may include a ridge-shaped portion 432. An optical signal may pass through the ridge-shaped portion 432. The ridge-shaped portion 432 may include a ridge-shaped semiconductor material. The ridge-shaped portion 432 may include an intrinsic semiconductor layer. That is, the ridge-shaped portion 432 may include an undoped semiconductor layer. The ridge-shaped portion 432 may include an intrinsic silicon layer. The ridge-shaped portion 432 may have various configurations. For example, the ridge-shaped portion 432 may have various shapes, widths, and heights. The ridge-shaped portion 432 may have a width of 500 nm and a height of 200 nm. The ridge-shaped portion 432 may include first and second regions 432A and 432B. The first region 432A may be referred to as a lower portion, and the second region 432B may be referred to as an upper portion. The first region 432A may have a larger width than the second region 432B. The first region 432A may have a smaller height than the second region 432B. In order to prevent a loss of an optical signal, the second region 432B may have a smaller width than the first region 432A. In this case, the second region 432B may be positioned in the center of the first region 432A. Thus, the ridge-shaped portion 432 may have a symmetrical structure such as a T-shaped structure.

The sidewalls of the first region 432A of the ridge-shaped portion 432 may be in contact with slab-shaped portions. For example, one side of the first region 432A of the ridge-shaped portion 432 may be in contact with a first slab-shaped portion 431A, and the other side of the first region 432A may be in contact with a second slab-shaped portion 431B. The other side may correspond to the opposite side of the one side. The ridge-shaped portion 432, the first slab-shaped portion 431A, and the second slab-shaped portion 431B may be simultaneously formed by partially etching the semiconductor layer. The first slab-shaped portion 431A and the second slab-shaped portion 431B may be formed of the same material as the ridge-shaped portion 432. For example, the ridge-shaped portion 432, the first slab-shaped portion 431A, and the second slab-shaped portion 431B may be formed of the same material such as silicon. Thus, no physical interface may exist between the ridge-shaped portion 432 and the first slab-shaped portion 431A. Furthermore, no physical interface may exist between the ridge-shaped portion 432 and the second slab-shaped portion 431B. The first slab-shaped portion 431A and the second slab-shaped portion 431B may have the same thickness. For example, the first slab-shaped portion 431A and the second slab-shaped portion 431B may have a thickness of 50 nm. The first region 432A of the ridge-shaped portion 432 may have the same thickness as the first slab-shaped portion 431A and the second slab-shaped portion 431B. The first slab-shaped portion 431A and the second slab-shaped portion 431B may contain a dopant therein. The dopant may include an N-type dopant or P-type dopant. In the present embodiment, the dopant may include an N-type dopant such as phosphorus. The dopant contained in the first slab-shaped portion 431A and the second slab-shaped portion 431B may have a high concentration. As such, the first and second slab-shaped portions 431A and 431B containing the dopant may be referred to as doping regions. When containing an N-type dopant, the first and second slab-shaped portions 431A and 431B may be referred to as a high-concentration N-type doping region. The dopant may have a concentration of approximately $10^{18}$ atoms/cm$^3$ or more. In another embodiment, the first slab-shaped portion 431A and the second slab-shaped portion 431B may be set to a low-concentration doping region and a high-concentration doping region, respectively. The low-concentration doping region may be formed proximate to the ridge-shaped portion 432, and the high-concentration doping region may be formed distal from the ridge-shaped portion 432. The low-concentration doping region may have a dopant concentration of approximately $10^{16}$ atoms/cm$^3$.

Carriers may be introduced into the ridge-shaped portion 432 from the first slab-shaped portion 431A and the second slab-shaped portion 431B. Furthermore, carriers may be discharged from the ridge-shaped portion 432 into the first slab-shaped portion 431A and the second slab-shaped portion 431B. As the carriers are introduced or discharged, the effective refractive index of the ridge-shaped portion 432 may be changed. Thus, an operation of modulating an optical signal may be performed.

As described above, the ridge-shaped portion 432 may include an undoped intrinsic region, and the first and second slab-shaped portions 431A and 431B may include an extrinsic region doped with a high-concentration dopant. In the present embodiment, the ridge-shaped portion 432 may include an undoped intrinsic silicon layer, and the first and second slab-shaped portions 431A and 431B may include an extrinsic silicon layer doped with a high-concentration dopant.

The optic modulation region may be manufactured in a ridge shape in which the first and second slab-shaped portions 431A and 431B having a small thickness are proximate to the ridge-shaped portion 432 having a large thickness. The ridge-shaped optic modulation region may be obtained by adjusting an etching time of the selective chemical etching process. The first and second slab-shaped portions 431A and 431B may be doped with a high-concentration conductive dopant through a doping process such as an ion implantation process. The doping process may include plasma doping.

A conductive electrode 450 having optical transparency may be formed to cover a part of the optical waveguide 430, that is, the top surface and both sidewalls of the ridge-shaped 432. The electrode 450 may include a metal containing material. The electrode 450 may be formed of conductive oxide. For example, the electrode 450 may include a transparent metal electrode formed of ITO. The electrode 450 may not be in contact with the ridge-shaped portion 432 set to an intrinsic region.

An inter-insulating layer 440 may be formed to cover a part of the optical waveguide 430, that is, the top surface and both sidewalls of the second region 432B of the ridge-shaped 432. The inter-insulating layer 440 may be positioned between the second region 432B and the electrode 450. The inter-insulating layer 440 may be formed of oxide. For example, the inter-insulating layer 440 may be formed by oxidizing the surface of the second region 432B. In another embodiment, the inter-insulating layer 440 may be formed by depositing oxide on the second region 432B. The inter-insulating layer 440 may have a thickness of less than 10 nm. The inter-insulating layer 440 may cover both sidewalls and the top surface of the second region 432B, and expose the surface of the first region 432A of the ridge-shaped portion 432. Thus, a part of the electrode 450 may be in contact with the first and second slab-shaped portion 431A and 431B.

The electrode 450 may serve as a gate electrode through the inter-insulating layer 440. When a predetermined voltage is applied to the electrode 450, a depletion region may be formed in the second region 432B, thereby adjusting a carrier concentration. In a comparative embodiment, polysilicon doped with a high-concentration dopant may be used as the electrode 450. However, polysilicon may significantly reduce an optical confinement factor. Since ITO has a refractive index with a relatively large difference. ITO may scarcely reduce the optical confinement factor, even though ITO is proximate to the optical waveguide 430. As a result, the MOS capacitor-structure optic modulator 400 having ITO as a gate may prevent the reduction in optical confinement factor, while guaranteeing a high-speed operation.

The optic modulation region and the electrode 450 may be protected by a passivation layer 461. The passivation layer 461 may include the same material as the insulating layer 420. For example, the passivation layer 461 may be formed of silicon oxide. In order to prevent a loss of an optical signal transmitted to the ridge-shaped portion 432, the passivation layer 461 may be formed to a small thickness.

A first plug 471A may be formed so as to connect to the first slab-shaped portion 431A. A second plug 471B may be formed so as to connect to the second slab-shaped portion 431B. The first and second plugs 471A and 471B may be formed through the passivation layer 461. For example, the passivation layer 461 may be selectively etched to form openings which expose the surfaces of the first and second slab-shaped portions 431A and 431B, respectively and the openings may be plugged up with a conductive material to simultaneously form the first and second plugs 471A and 471B, respectively. Reference numerals of the openings are omitted herein. The first and second plugs 471A and 471B may include a metal containing material. Thus, the first and second plugs 471A and 471B may be referred to as metal plugs. The first and second plugs 471A and 471B may include aluminum, tungsten, copper, or a combination thereof. A third plug 471I may be formed at the same level as the first and second plugs 471A and 471B. The third plug 471I may be connected to the optical waveguide electrode 450. The first plug 471A, the second plug 471B, and the third plug 471I may be formed at the same time.

The first and second plugs 471A and 471B may be connected to first and second pads 481A and 481B, respectively, which can independently apply electrical signals. The first and second pads 481A and 481B may be formed of a metal containing material. The first and second pads 481A and 481B may include aluminum, copper, or tungsten. A third pad 481I may be formed at the same level as the first and second pads 481A and 481B. The third pad 481I may be connected to the third plug 471I. The first pad 481A, the second pad 481B, and the third pad 481I may be formed at the same time. The first pad 481A, the second pad 481B, and the third pad 481I may receive different electrical signals.

The above-described effective refractive index modulation structure can be used in various types of optic modulators. For example, the effective refractive index modulation structure may modulate the refractive index of a micro ring in a ring modulator having a structure in which the micro ring is proximate to an optical waveguide, or may be applied to a phase modulation unit in a Mach-Zehnder interferometric sensor.

Since the other components of the optic modulator excluding the optic modulation region are the same as those of general technology, the detailed descriptions thereof are omitted herein.

Figure 5A:
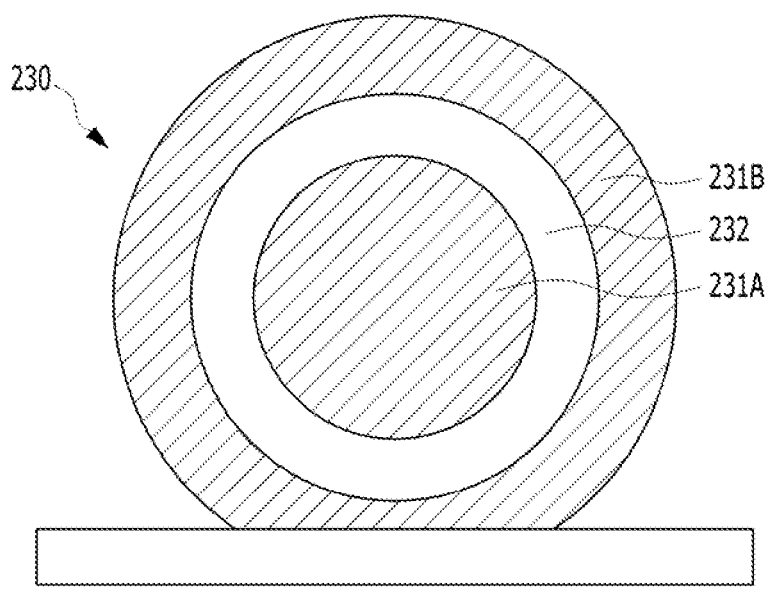
FIG. 5A is a diagram illustrating a micro-ring modulator.
Figure 5B:
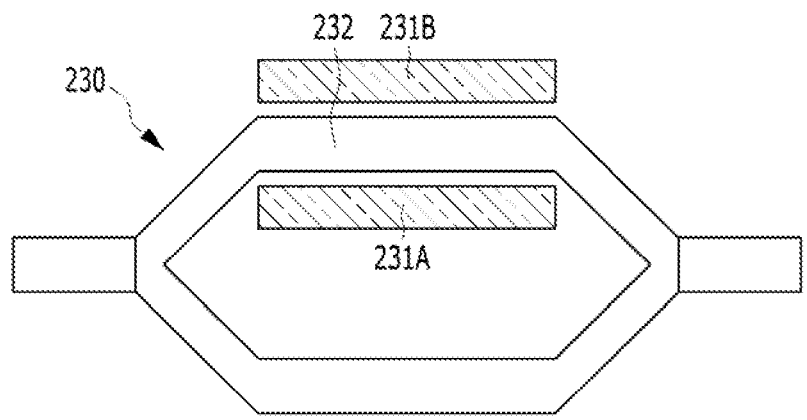
FIG. 5B is a plan view of a Mach-Zehnder interferometer-type modulator.

FIG. 5A is a diagram illustrating a micro-ring modulator. FIG. 5B is a diagram illustrating an optic modulation region in a plan view of a Mach-Zehnder interferometer-type modulator. The cross-sectional structure of the optic modulation region may coincide with the cross-sectional structure of the above-described optic modulator.

The semiconductor substrates described in the above embodiments may be replaced with another substrate, and the optic modulator formed through the above method may be transplanted into another substrate including a flexible substrate.

The above embodiments may be commonly applied to all kinds of optical integrated circuits including the following cases. For example, the above embodiments may be applied to an SoC (System On Chip) including a communication function between integrated circuits using optical signal modulation, a nano-photonics chip having a computing function through optical signal processing, an optical integrated circuit having an optical signal transmission/processing function and applied to a flexible substrate, and a chemical/physical/biological sensor which modulates an external environmental change into an optical signal.

Although various embodiments have been described for illustrative purposes, it will be apparent to those skilled in the art that various changes and modifications may be made without departing from the spirit and scope of the invention as defined in the following claims.

What is claimed is:

1. An optic modulator comprising:
    an optical waveguide comprising a ridge-shaped portion having a first region and a second region over the first region;
    a slab-shaped portion being in contact with a first region of the ridge-shaped portion;
    an optical waveguide electrode forming a Schottky contact with a second region of the ridge-shaped portion;
    metal plugs being in contact with the slab-shaped portion and its the optical waveguide electrode, respectively; and
    metal pads connected to the respective metal plugs.

2. The optic modulator of claim 1, wherein the optical waveguide electrode comprises a conductive material optical transparency.

3. The optic modulator of claim 1, wherein the optical waveguide electrode comprises ITO (Indium Tin Oxide).

4. The optic modulator of claim 1, wherein the contact area between the ridge-shaped portion and the optical waveguide electrode is larger than the contact area between the ridge-shaped portion and the slab-shaped portion.

5. The optic modulator of claim 1, further comprising:
    a semiconductor substrate; and
    an insulating layer over the semiconductor substrate,
    wherein the optical waveguide and the slab-shaped portion are positioned over the insulating layer.

6. The optic modulator of claim wherein slab-shaped portion comprises:
    a first slab-shaped portion being in contact with one side of the first region of the ridge-shaped portion; and
    a second slab-shaped portion being in contact with the other side of the first region of the ridge-shaped portion.

7. The optic modulator of claim 1, wherein the ridge-shaped portion comprises an undoped intrinsic silicon layer, and the slab-shaped portion comprises an extrinsic silicon layer doped with an N-type dopant.

8. The optic modulator of claim 1, wherein the ridge-shaped portion and the slab-shaped portion have different thicknesses while being in horizontal contact with each other.

9. The optic modulator of claim 1, wherein the cross-section of the optical waveguide has a smaller size than the effective wavelength of light passing through the optical waveguide.

10. The optic modulator of claim 1, wherein the slab-shaped portion and the first region of the ridge-shaped portion have the same thickness, and the slab-shaped portion has a smaller thickness than the second region of the ridge-shaped portion.

11. The optic modulator of claim 1, wherein the semiconductor substrate, the optical waveguide, and the slab-shaped portion comprise silicon, SiGe, or compound semiconductor.

12. The optic modulator of claim 1, wherein the optic modulator has a one-side structure in which the slab-shaped portion is in contact with one side of the first region of the ridge-shaped portion.

13. An optic modulator comprising:
    a Schottky diode comprising a ridge-shaped portion containing intrinsic silicon, a slab-shaped portion being in contact with a first region of the ridge-shaped portion and containing extrinsic silicon, and ITO forming a Schottky contact with a second region of the ridge-shaped portion;
    metal plugs being in contact with the slab-shaped portion and the optical waveguide electrode, respectively; and
    metal pads connected to the respective metal plugs.

14. The optic modulator of claim 13, wherein the contact area between the ridge-shaped portion and ITO is larger than the contact area between the ridge-shaped portion and the slab-shaped portion.

15. The optic modulator of claim 13, wherein the slab-shaped portion comprises:
    a first slab-shaped portion being in contact with one side of the first region of the ridge-shaped portion and containing first extrinsic silicon; and
    a second slab-shaped portion being in contact with the other side of the first region of the ridge-shaped portion and containing second extrinsic silicon.

16. The optic modulator of claim 13, wherein the second region of the ridge-shaped portion has a larger thickness than the first region of the ridge-shaped portion, and the first region and the slab-shaped portion have the same thickness.

17. An optic modulator comprising:
- an optical waveguide comprising a ridge-shaped portion having a first region and a second region over the first region;
- a slab-shaped portion being in contact with the first region of the ridge-shaped portion;
- an electrode covering the top surface and both sidewalls of the second region of the ridge-shaped portion;
- an inter-insulating layer positioned between the electrode and the second region;
- metal plugs being in contact with the slab-shaped portion and an electrode, respectively; and
- metal pads connected to the respective metal plugs.

18. The optic modulator of claim 17, the electrode comprises ITO.

19. The optic modulator of claim 17, wherein the ridge-shaped portion contains intrinsic silicon, and the slab-shaped portion contains extrinsic silicon.

20. The optic modulator of claim 17, wherein a part of the electrode is in contact with the first region of the ridge-shaped portion.

* * * * *